United States Patent
Kim et al.

(10) Patent No.: US 8,992,328 B2
(45) Date of Patent: Mar. 31, 2015

(54) METHOD, APPARATUS, AND RECORDING MEDIUM FOR PLAYING GAME WITH SERVER TRANSFERRING IN ONLINE GAME ENVIRONMENT

(75) Inventors: Jung Han Kim, Seoul (KR); Hyun Chul Kim, Yongin-si (KR); Hyun Gyu Park, Seoul (KR)

(73) Assignee: Bluehole Studio, Inc., Bundang-gu (KR)

( * ) Notice: Subject to any disclaimer, the term of this patent is extended or adjusted under 35 U.S.C. 154(b) by 0 days.

(21) Appl. No.: 13/698,482

(22) PCT Filed: May 17, 2011

(86) PCT No.: PCT/KR2011/003612
§ 371 (c)(1),
(2), (4) Date: Nov. 16, 2012

(87) PCT Pub. No.: WO2011/145855
PCT Pub. Date: Nov. 24, 2011

(65) Prior Publication Data
US 2013/0059656 A1    Mar. 7, 2013

(30) Foreign Application Priority Data
May 20, 2010    (KR) ................. 10-2010-0047415

(51) Int. Cl.
*A63F 13/00* (2014.01)
*A63F 13/30* (2014.01)
*H04L 29/06* (2006.01)

(52) U.S. Cl.
CPC ........... *A63F 13/12* (2013.01); *A63F 2300/513* (2013.01); *A63F 2300/531* (2013.01); *A63F 2300/554* (2013.01); *A63F 2300/807* (2013.01); *H04L 67/38* (2013.01)
USPC ............................................. 463/42; 463/35

(58) Field of Classification Search
CPC .............. A63F 13/12; A63F 2300/407; A63F 2300/50; A63F 2300/534; G06F 21/121
USPC ....................................................... 463/16–43
See application file for complete search history.

(56) References Cited

U.S. PATENT DOCUMENTS 7,824,253 B2 * 11/2010 Thompson et al. ................ 463/7
7,945,644 B2 *  5/2011 Kim et al. ...................... 709/219
(Continued)

FOREIGN PATENT DOCUMENTS

JP      2009-086728 A      4/2009
KR   10-2008-0035289 A    4/2008
(Continued)

OTHER PUBLICATIONS

International Search Report (in English) and Written Opinion (in English) for PCT/KR2011/003612, mailed Dec. 20, 2011; ISA/KR.

*Primary Examiner* — Masud Ahmed
(74) *Attorney, Agent, or Firm* — Saliwanchik, Lloyd & Eisenschenk

(57) ABSTRACT

Disclosed are a method, an apparatus, and a recording medium for playing a game with server transferring in an online game environment. The method includes: receiving identification information for login from a first client; transmitting online game environment information to the first client; performing an advance operation of the server transferring for a server transferring of a second client with an outside server; receiving data for playing the game transmitted from the outside server or the second client; transmitting a resulting data of game play, in which the received data is applied to the online game environment, to the outside server or the second client, which has transmitted the data for playing the game; and storing a result of an interaction generated between the first client and the second client in a game history of the first client.

3 Claims, 11 Drawing Sheets

(56) References Cited

U.S. PATENT DOCUMENTS

| | | | |
|---|---|---|---|
| 8,360,856 B2* | 1/2013 | Ealey | 463/24 |
| 2003/0008712 A1* | 1/2003 | Poulin | 463/42 |
| 2006/0069731 A1* | 3/2006 | Hirao et al. | 709/206 |
| 2006/0224761 A1* | 10/2006 | Howarth et al. | 709/231 |
| 2009/0089363 A1* | 4/2009 | Keohane et al. | 709/203 |
| 2010/0093438 A1* | 4/2010 | Baszucki et al. | 463/42 |
| 2010/0131615 A1* | 5/2010 | Kim et al. | 709/219 |
| 2010/0203971 A1* | 8/2010 | Ealey | 463/42 |

FOREIGN PATENT DOCUMENTS

| | | |
|---|---|---|
| KR | 10-2009-0015262 A | 2/2009 |
| KR | 10-2009-0093367 A | 9/2009 |

* cited by examiner

Fig. 10

| PLAYER IDENTIFICATION INFORMATION (PID) | SERVER IDENTIFICATION INFORMATION (SID) | LEVEL | ENERGY | ITEM |
|---|---|---|---|---|
| PLAYER-1 | SERVER-1 | 50 | 135 | SWORD1 |
| PLAYER-2 | 0 | 46 | 148 | CASTLE1 |
| PLAYER-3 | SERVER-1 | 55 | 250 | SWORD1+CASTLE1 |
| PLAYER-4 | 0 | 35 | 95 | MAGIC-COAT1 |
| PLAYER-5 | SERVER-2 | 48 | 210 | MAGIC-COAT1+CASTLE1 |

HISTORY INFORMATION(1000)

METHOD, APPARATUS, AND RECORDING MEDIUM FOR PLAYING GAME WITH SERVER TRANSFERRING IN ONLINE GAME ENVIRONMENT

TECHNICAL FIELD

The present invention relates to an online game system, and more particularly to a method, an apparatus, and a recording medium for storing and transmitting/receiving information for server transferring during playing of a game in an online game environment.

BACKGROUND ART

As generally known in the art, an online game is one of various genres of games in which a game player accesses a predetermined server through a computer, a notebook computer, etc. so as to play the game with other game players in real-time.

DISCLOSURE OF INVENTION

Solution to Problem

An aspect of the present invention proposes transmission/reception of game information for a server transferring, by which a game player can access another server and then play a game by using information generated during a process of accessing one server to play the game.

Another aspect of the present invention enables information generated during playing of a game to be exchanged or temporally stored between servers, so as to prevent omission of the information.

Another aspect of the present invention proposes operating processes of the server and the client, a recording medium, and a system in order to play the game with the server transferring.

In order to accomplish this object, there is provided a method for playing a game with a server transferring in an online game environment, the method including: receiving identification information for login from a first client; transmitting online game environment information to the first client; performing an advance operation of the server transferring for server transferring of a second client with an outside server; receiving data for playing the game transmitted from the outside server or the second client; transmitting a resulting data of game play, in which the received data is applied to the online game environment, to the outside server or the second client, which has transmitted the data for playing the game; and storing a result of an interaction generated between the first client and the second client in a game history of the first client.

BRIEF DESCRIPTION OF DRAWINGS

FIG. 10 illustrates a construction of information stored in a history database unit according to an embodiment of the present invention;

MODE FOR THE INVENTION

Figure 1:
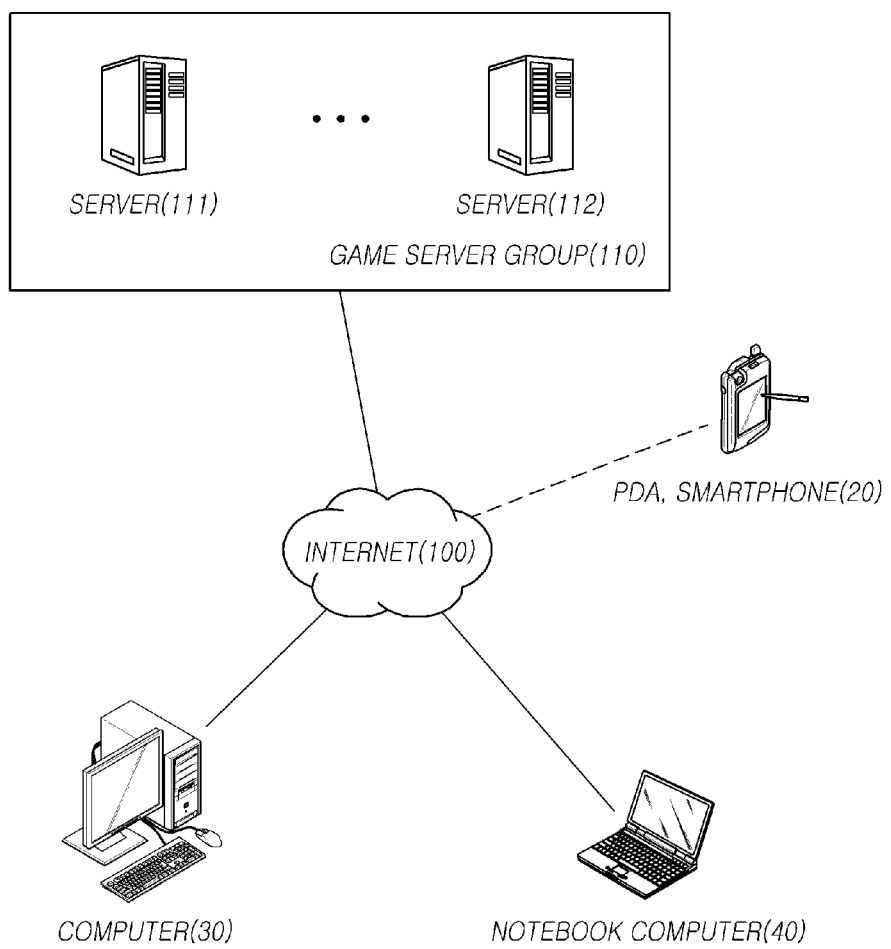
FIG. 1 illustrates a construction of an online game to which an embodiment of the present invention is applied.

Hereinafter, exemplary embodiments of the present invention will be described with reference to the accompanying drawings. FIG. 1 illustrates a construction of an online game to which embodiments of the present invention are applied.

In FIG. 1, a computer 30, a notebook computer 40, and a PDA (Personal Digital Assistant)/smartphone 20, which are an embodiment of a client, are connected to a game server group 110 through an internet so that an online game can be played. The servers may be servers divided by a network, that is, servers physically separated from each other, or independent processes, which are logically independent.

In FIG. 1, the clients 20, 30, and 40 access the server group 110 via the internet 100. In the server group, the server 111, which a corresponding client will access, can be preset.

The server transferring according to an embodiment of the present invention means that when the client accessing an online game server group including a plurality of servers transfers to another server while playing a game in one server, the client successively plays the game by using a part of history information of the game, which the client has played so far, in the server, to which the client has transferred.

Hereinafter, a server in which the client originally plays the game is referred to as a base server, and a server to which the client has transferred is referred to as a transferring server. The game server group includes the base server and the transferring server. The game server group may selectively include a center server or a relay server. The center server and the relay server may include a user database for identifying identification information of a user accessing the client and a history database for storing a game history of the user.

Figure 2:
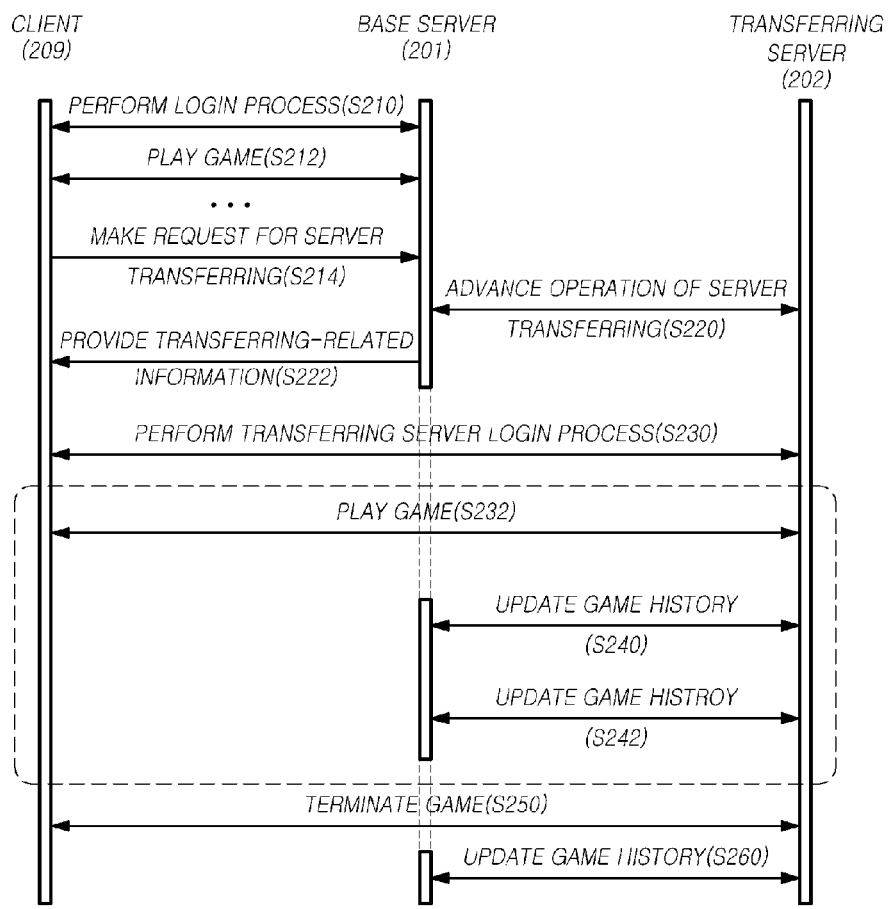
FIGS. 2, 3, 4, and 5 are signal flow diagrams illustrating processes of server transferring according to an embodiment of the present invention.

FIG. 2 is a signal flow diagram illustrating a process of server transferring when the game server group includes only the base server and the transferring server according to an embodiment of the present invention.

The client 209 performs a login process with the base server 201 S210. The base server 201 may include the user database storing information required for the login process, such as an ID, a password, etc. The login process includes transmission of the identification information and the password of the player to the base server 201 by the client 209, permission of an access of the player after identifying the identification information and the password of the player by the base server 201, and simultaneous transmission of online game environment information in accordance with the corresponding identification information by the base server 201. When the login process is performed, the client 209 receives game-related data and then the game is played S212. When the game is based on a map, the game-related data includes information with regard to adjacent locations of a current location, objects, other players, and monsters. In a process of playing the game of step S212, the player can interact with the other players, the monsters, and the adjacent objects. The interaction includes all of battles, movements of the objects, and acquisition generated between game entities, conversation between players, or actions of helping each other. A part or all of the interactions or situation changes generated in the process of playing the game is stored in the history database. The storage enables the client 209 to use intact play information of the game, which the client has previously played, when the client 209 again accesses the base server 201 to play the game after stopping an access to the server 201. The history database includes information required for the successive game, such as a skill, a level, possessed items according to the skill and the level, weapons, supernatural powers, a score, a location, environment of acquired items, etc., and the information may be diversely configured according to a characteristic of the game.

The client 209 makes a request for the server transferring to the base server 201 while the game is played S214. The client 209 can request to transfer a particular server, and the base server 201 can search for the server to be transferred by the request of the client. The base server 201 performs an advance operation of the server transferring with the transferring server 202 S220. The advance operation of the server transferring includes providing the transferring server 202 with information required for playing the game by the client 209. The information may include history data, login information of the client 209, or identification information of the client 209.

When the advance operation of the server transferring is completed, the base server 201 provides the client 209 with the transferring-related information. An embodiment of the provided information includes information including an address of the transferring server 202, information required for the login, temporary identification information to be used in the transferring server 202, etc. The temporary identification information provides functions of preventing overlapped identification information from being generated, and enabling the transferring server to distinguish the original game players from the transferred clients.

Then, the client 209 performs the login process with the transferring server 202 by using the provided information S230. When the login is succeeded, the client 209 plays the game in the transferring server 202 S232.

In the process of playing the game, the transferring server 202 can selectively update the game history to the base server S240 and S242. That is, the transferring server 202 can update the history data of the base server 201. The process of updating the game history may be performed at regular intervals, or performed in a point where the update is generated. As another embodiment, when the game is terminated in step S250, the transferring server 202 can update the game history of the base server 201 so as to update the history information generated by the game, which has been played so far S260.

As an embodiment of the game played in the transferring server 202, FIG. 2 provides a game, in which the client 209 functions as the monster in a map or a world provided in the transferring server 202. For example, it is supposed that A and B who play the game as players in a first server (base server) transfer to a second server (transferring server). In the second server, C, D, and E play the game as players, and M and N play the game as monsters. The game, in which the players C, D, and E join a battle with the monsters M and N, may be played in the second server. At this time, when the players A and B transfer to the second server, the second server may control such that the players C, D, and E recognize the players A and B as the monsters. As a result, the players C, D, and E join a battle with the players A and B as well as the monsters M and N. The players A and B, of course, join a battle with the players C, D, and E, and can obtain a performance level of the game or a score in the second server.

Figure 3:
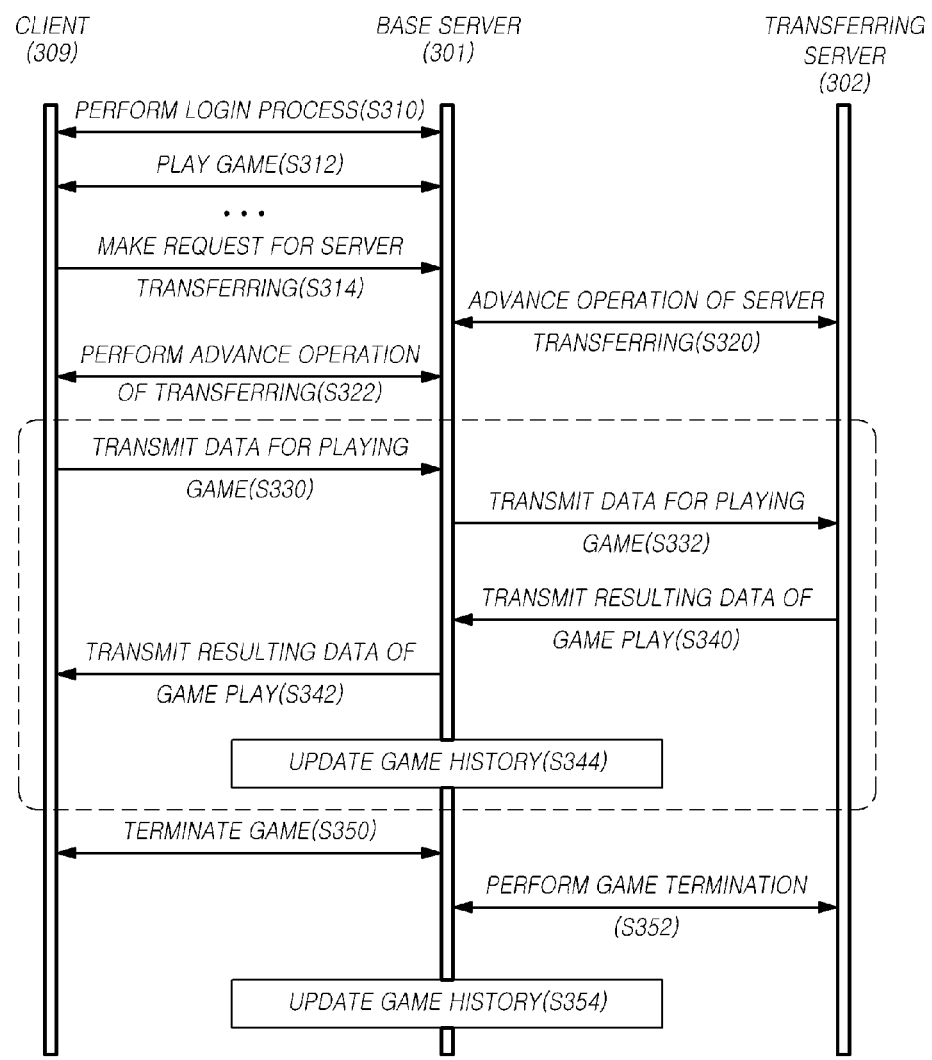

FIG. 3 is a signal flow diagram illustrating a process in which the client accesses the transferring server via the base server to play the game when the game server group includes only the base server and the transferring server according to another embodiment of the present invention.

FIG. 3 includes the client 309, the base server 301, and the transferring server 302. The login process S310, the game play in the base server 301 S312, and the process of making a request for the server transferring in the base server 301 S314 may be performed identically to S210, S212, and S214 of FIG. 2.

After the client 309 makes a request for the server transferring to the base server 301 S314, the base server 301 performs an advance operation of the server transferring with the transferring server 302 S320. At this time, since the client 309 accesses the transferring server 302 via the base server 301, the advance operation required for the server transferring can be performed. For example, FIG. 3 includes providing the transferring server 302 with information required for playing the game in the transferring server 302 via the base server 301 by the client 309. Game history data can be provided to the transferring server 302 in real-time because the game history data is transmitted via the base server 301. When the advance operation between the base server 301 and the transferring server 302 is completed or is in progress, the client 309 performs the advance operation with the base server 301 S322. Subsequently, the player of the client 309 plays the game in a game space (e.g. world, map, etc.) provided by the transferring server 302. The client 309 can move the player or make the player take actions in order to play the game, or perform an operation for making a request for information of the game space. That is, the client 309 transmits data for playing the game S330. The data for playing the game includes a distance and a speed related to the movement, an action in a battle process, an action for acquiring items, an action for making a request for adjacent information, etc., and the data may be diversely configured according to a characteristic of the game. The base server 301 transmits the data to the transferring server 302 S332. Although it is not illustrated in figures, the game history can be updated while the base server 301 transmits the data for playing the game to the transferring server 302 or before and after the base server 301 transmits the data for playing the game to the transferring server 302. The transferring server 302, which has received the data for playing the game, plays the game and then transmits resulting data of the game play S340. That is, the resulting data of the game play may be information with regard to the game space affected after the player moves in a certain direction, and may include a battle result when the player joins a battle with other entities. Further, the resulting data of the game play may include a result of item acquisition, capacity according to the item acquisition, a score change, etc. Moreover, the resulting data of the game play may include information for updating adjacent situations in which other players or entities in other game spaces are changed although the player of the client 309 does not perform any action. The base server 301 receives the resulting data of the game play transmitted from the transferring server 302, and then transfers the resulting data of the game play to the client 309. Further, the base server 301 can update the game history by analyzing the resulting data of the game play S344. Subsequently, steps S330 to S344 may be repeatedly performed while the game is played. When the client 309 terminates the game S350, the base server 301 and the transferring server 302 perform an operation in accordance with the game termination S352. In the process of the game termination, the game history may be updated S354.

Figure 4:
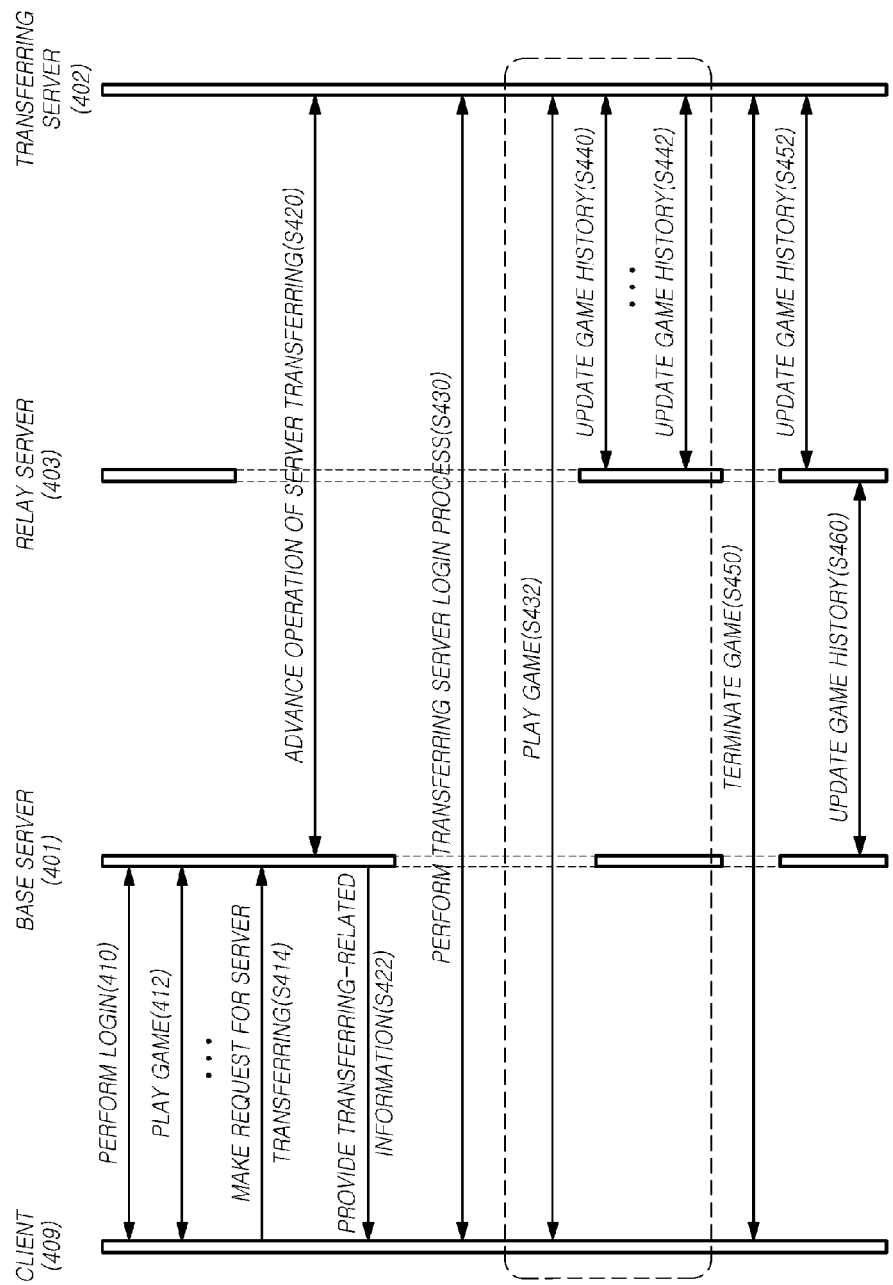

FIG. 4 includes the base server 401, the relay server 403, and the transferring server 402 of the game server group according to an embodiment of the present invention. FIG. 4 illustrates a process in which the client 409 plays the game in the base server 401, and then plays the game in the transferring server by performing the server transferring.

The login process performed by the client 409 with the base server 401 S410, the process of game play S412, the request for the server transferring S414, the advance operation of the server transferring S420, and the process of providing the transferring-related information S422 are identical to steps S210, 212, S214, S220, and S222 of FIG. 2 described above, so that the description of steps S410, S412, S414, and S420 can be replaced with the corresponding description of FIG. 2.

The client 409 provided with the transferring-related information performs the login process to the transferring server 402 S430. Then, the client 409 plays the game in the transferring server S432. In this case, the game history is not temporarily stored in the transferring server 402, but is transmitted to the relay server 403 and then the relay server 403 performs the game history update S440 and S442. A part of the information may be, of course, stored in the transferring server 402 in order to play the game. When the game is completed and terminated S450, the transferring server 402 updates the game history, which should be stored in the base server 401 after the game termination, to the relay server 403 S452. When the update is completed, the relay server 403 performs the game history update with the base server 401 S460.

Figure 5:
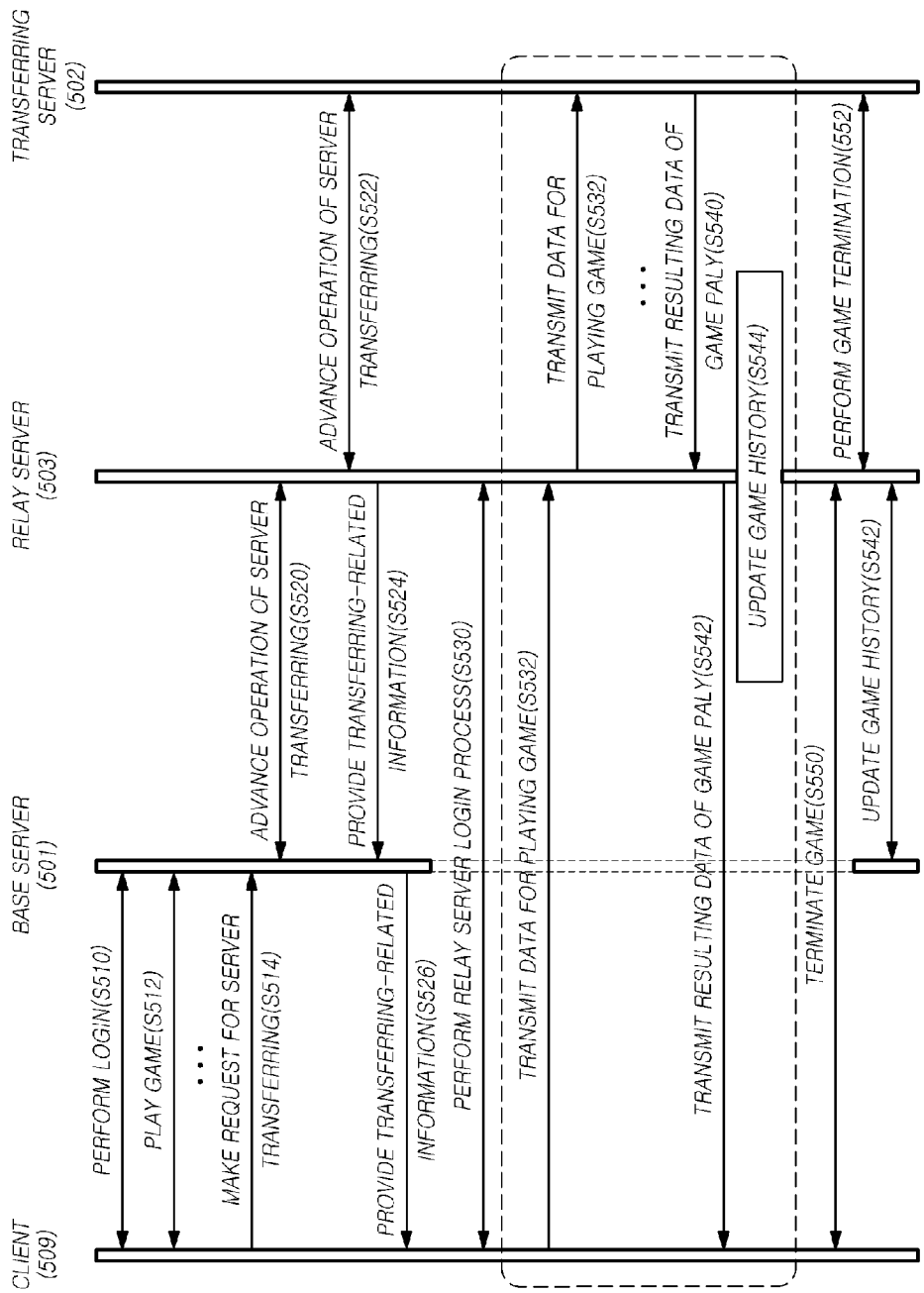

FIG. 5 is a signal flow diagram illustrating a process in which the server transferring is performed when the game server group includes the base server, the transferring server, and the relay server according to an embodiment of the present invention.

The login process performed by the client 509 with the base server 501 S510, the process of game play S512, and the request for the server transferring S514 are identical to steps S310, S312, and S314 of FIG. 3 described above, so that the description of steps S510, S512, and S514 can be replaced with the corresponding description of FIG. 3.

When the client 509 makes a request for the server transferring to the base server 501 S514, the base server 501 performs an advance operation of the server transferring with the relay server 503 for relaying the server transferring S520. In this process, the relay server can also perform the advance operation of the server transferring with the transferring server 502 S522. The advance operation of the server transferring S520 performed between the base server 501 and the relay server 503 may include processes, in which the client 509 accesses the relay server 503 and the client 509 identifies information of the server 502 to be transferred. Meanwhile, the advance operation of the server transferring S522 performed between the relay server 503 and the transferring server 502 may include processes, in which information of the client 509 and the base server 501 is shared and network information is set in order to update the game history. Then, the relay server 503 provides the base server 501 with the transferring-related information generated by a result of step S522, and the base server 501 provides the client 509 with a part or all of the received transferring-related information S526. Subsequently, the client 509 starts playing the game and transmits data for playing the game to the relay server 503 S530. The data for playing the game is transmitted to the relay server 503 S530, and the relay server 503 transmits the data to the transferring server 502 S532. Although it is not illustrated in figures, the game history can be updated while the relay server 503 transmits the data for playing the game to the transferring server 502 or before and after the relay server 503 transmits the data for playing the game to the transferring server 502. The transferring server 502, which has received the data for playing the game, plays the game and transmits resulting data of the game play to the relay server 503 S540. After receiving the resulting data of the game play transmitted from the transferring server 502, the relay server 503 transmits the resulting data of the game play to the client 509 S542. In this process, the relay server 503 may, of course, transmit only a part of the information. Further, the relay server 503 can update the game history by analyzing the resulting data of the game play S544. Then, steps S530 to S544 may be repeatedly performed while the game is played. Subsequently, when the client 509 terminates the game S550, the relay server 503 and the transferring server 502 perform an operation in accordance with the game termination S552. In the process of the game termination or after the process of the game termination, the relay server 503 and the base server 501 update the game history stored in the relay server 503 S554. As a result, information of the game played in the transferring server 502 is stored in the base server 501, and then the client 509 can play the game by using the game history stored in the base server 501 when the client 509 accesses the base server 501 at a later time.

Unlike embodiments of FIGS. 2, 3, 4, and 5, the client can acquire information of the transferring server and then directly make a request for the server transferring to the transferring server.

Figure 6:
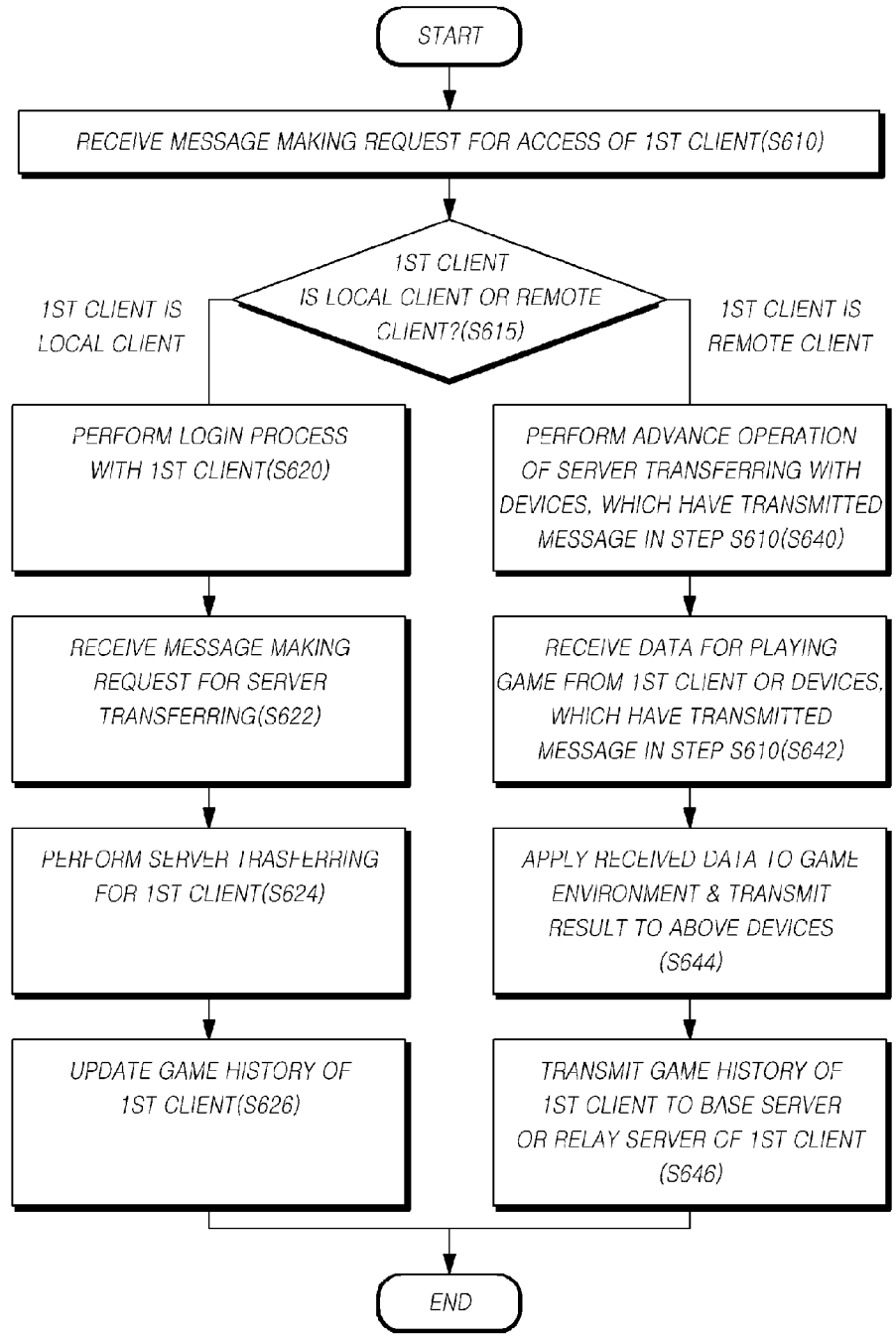
FIG. 6 is a flowchart illustrating an operating process of a server of a game server group according to an embodiment of the present invention.

FIG. 6 is a flow chart illustrating an operating process of the server of the game server group according to an embodiment of the present invention.

The server provides both functions of the base server and the transferring server. That is, a device, which is the base server for a particular client, can be a transferring server for another client. Inversely, a device, which is the transferring server for a particular client, can be a base server for anther client.

The clients according to the present invention are divided into a local client and a remote client. One client can be the local client or the remote client depending on whether the server is the base server or the transferring server from the point of view of the server. For example, the clients 209, 309, 409, and 509 in FIGS. 2, 3, 4, and 5 described above are the local clients from the point of view of the base servers 201, 301, 401, and 501, while the clients 209, 309, 409, and 509 are the remote clients from the point of view of the transferring servers 202, 302, 402, and 502.

The server receives a message including a request for an access of a first client S610. The message may be transmitted by the first client, or by an outside server or a relay server, which the first client accesses.

Through an analysis of the received message, it can be identified whether the first client is the local client or the remote client S615. The above identification is implemented by using identification information of the client included in the message including a request for the access of the first client, a message type, etc.

When the first client is the local client, the server performs the login process with the first client S620. The prior game information, which is the game history information, of the player who logs in through the first client is stored in the server, and the server provides the first client with a function of the base server. The first client can play the game after the login process. That is, the server provides the function of the base server. In the above process, the server receives a message including a request for the server transferring S622. When the server receives the message including a request for the server transferring, the server should allow the first client to access an outside transferring server directly or through the server, so as to play the game. Therefore, the server performs an advance operation of the server transferring for the outside transferring server or the relay server, and then performs the server transferring for the first client by using information received by a result of the advance operation S624. Subsequently, the first client plays the game in a game environment of the transferring server, and updates the game history generated in the process of playing the game in real-time or at a particular point S626.

Meanwhile, when the first client is the remote client in step S615, the server is operated as the transferring server. Meanwhile, the message in step S610 may be transmitted by the outside base server or the relay server as described with reference to FIGS. 2, 3, 4, and 5. However, unlike that, the message may be directly requested by the first client. Therefore, the server performs an advance operation of the server transferring with the devices (base server, relay server, and first client), which have transmitted the message in step S610 S640. In this process, the server receives all or a part of the game history of the first client from the base server of the first client or the relay server of the first client, and can temporarily store the received game history. Subsequently, the server accesses the first client directly or indirectly through the base server, relay server, etc., and then receives data, which is generated by the first client, for playing the game S642.

The server applies the received data to the game environment, and transmits a result of the application to the devices (one of the first client, the base server, and the relay server), which have transmitted the data for playing the game S644. And then, the server transmits the game history of the first client to the base server of the first client or the relay server of the first client, so as to perform the game history update S646. Subsequently, the first client plays the game by repeatedly or selectively performing steps S642, S644, and S646.

Figure 7:
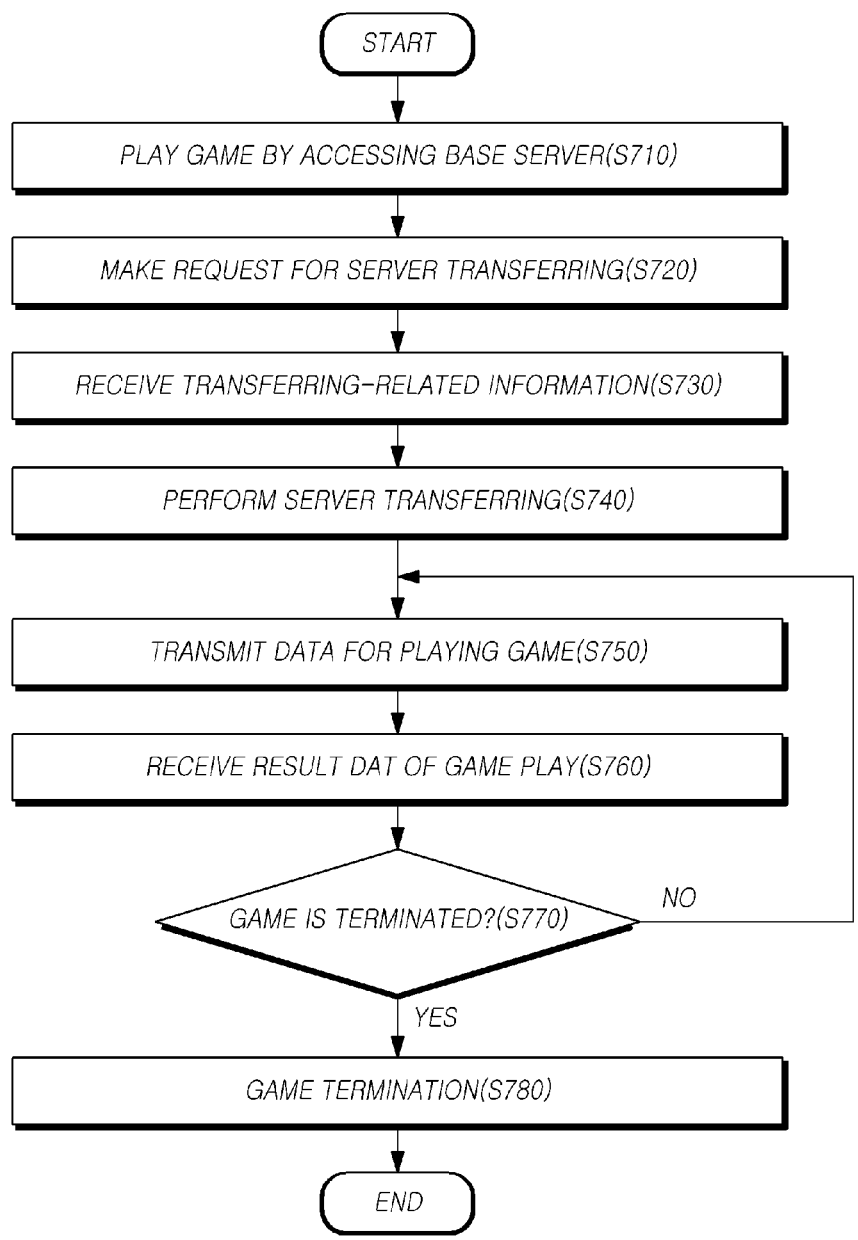
FIG. 7 illustrates an operating process of a client according to an embodiment of the present invention.

FIG. 7 is a flow chart illustrating an operating process of the client according to an embodiment of the present invention. FIG. 7 illustrates a process in which the client plays the game in an online game environment of the transferring server after the client accesses the base server and then performs the server transferring.

First, the client accesses the base server S710. In the process of playing the game by accessing the base server, the client can perform the server transferring to an outside server. The client makes a request for the server transferring for the base server or the outside server (transferring server or relay server) S720. After an advance operation of the server transferring is performed, the client receives the transferring-related information S730. The transferring-related information may include a network construction, information, which should be shared between the servers, and information, which should be shared between the client and the server.

After receiving the transferring-related information, the client performs the server transferring S740. The server transferring may be performed by methods in which the client accesses the transferring server via the base server or the relay server as shown in FIGS. 3 and 5, or the client directly accesses the transferring server as shown in FIGS. 2 and 4. After performing the server transferring, the client transmits data for playing the game S750. As described above, the data includes control information inputted from the client in order to play the online game. The data includes information of indicating movements to the player, or indicating predetermined actions such as the battle or the item acquisition to the player. When the player is controlled, the client can indicate that the movements, the battle, and the item acquisition of the player are performed in the transferring server. Further, the client receives the resulting data of the game play including information generated to other players by the actions of the player, or results generated by performing actions such as the battle, the movements, and the item acquisition of other players S760. When the client accesses the transferring server directly or indirectly, the data transmission/reception can be also performed directly or indirectly.

Then, steps S750 and S760 may be repeatedly performed before the game is terminated. Although there is no change of the player, changed situations of other players may be identified through step S760.

When the game is terminated S780, the game history update between the transferring server and the base server or the relay server and the base server may be performed.

Figure 8:
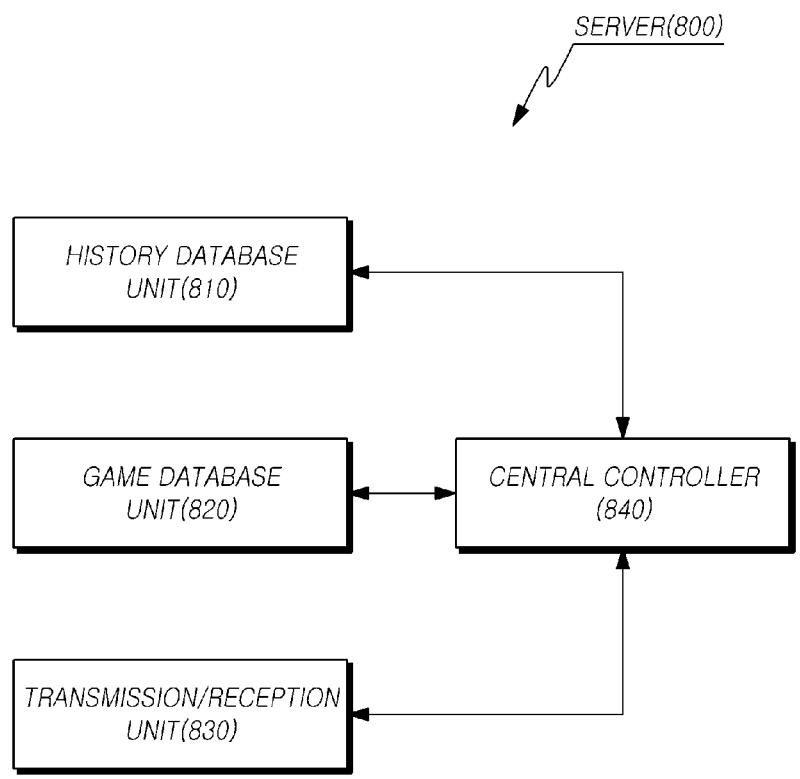
FIG. 8 is a block diagram illustrating a construction of the server according to an embodiment of the present invention.

FIG. 8 is a block diagram illustrating a construction of the base server or the transferring server according to an embodiment of the present invention. The server in FIG. 8 may be the base server for a particular client, and the transferring server for another client.

The entire construction of the server 800 includes a history database unit 810, a game database unit 820, a transmission/reception unit 830, and a central controller 840.

The transmission/reception unit 830 transmits/receives data through a network. The transmission/reception unit 830 receives identification information for performing the login, a message of making a request for the server transferring, and data generated in the process of playing the game from the client, provides response data in response to the reception, for example, data including the transferring-related information, transmits the game resulting data of the game play, or transmits data including information with regard to a game environment when the first login is performed to the client. Further, the transmission/reception unit 830 can transmit/receive data in order to perform the server transferring with an outside server.

The history database unit 810 stores the game history of the local client, and temporarily stores the game history of the remote client.

The game database unit 820 stores online game data required for playing the game. For example, the online game data may include information required for forming a map in playing the online game, information of many structures in the map, monster information, etc. The game database unit 820 includes information required for playing the game, and the information may be modified or added by the participation of the players. Therefore, although all the servers initially store the same data to the game database unit 820, the game data may become different from each other by various players playing the game through the clients accessing the servers. According to an embodiment of the present invention, the game data stored in the game database unit 820 by the base server and the transferring server may differ from each other.

The central controller 840 performs the online game by controlling the transmission/reception unit 830, the history database unit 810, and the game database unit 820.

Referring to a function of the central controller 840 in more detail, the central controller 840 controls the transmission/reception unit 830 such that the local client and the remote client can play the game in the same online game environment, and allows the resulting data of the game play to be transmitted to the local client and the remote client directly or indirectly. The above includes the process in which the base server or the transferring server of FIGS. 2, 3, 4, and 5 diversely transmits/receives information for the local client and the remote client.

Further, the central controller 840 can control the transmission/reception unit 830 such that the game history of the remote client temporarily stored in the history database unit 810 is transmitted to the base server of the remote client or the relay server of the remote client.

Also, the central controller 840 can control the transmission/reception unit 830 such that the resulting data (resulting data of game play) generated by playing the game through the base server or the relay server of the remote client is transmitted to the transmission/reception unit 830.

The central controller 840 can provide the functions of the base servers and the transferring servers of FIGS. 2, 3, 4, and 5 described above. Therefore, the central controller 840 controls the server 800 such that the base servers and the transferring servers of FIGS. 2, 3, 4, and 5 perform the login, the game, and the server transferring with the client.

Figure 9:
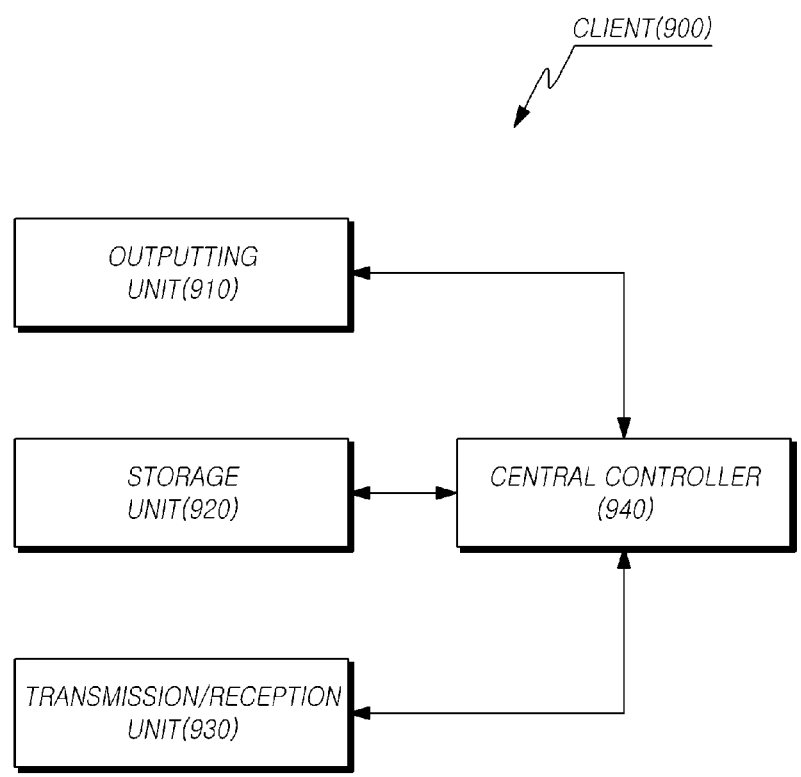
FIG. 9 is a block diagram illustrating a construction of the client according to an embodiment of the present invention.

FIG. 9 is a block diagram illustrating a construction of the client according to an embodiment of the present invention.

In FIG. 9, the client 900 includes the transmission/reception unit 930, a storage unit 920, an outputting unit 910, and the central controller 940. Referring to FIG. 9 in more detail, the transmission/reception unit 930 transmits/receives data to/from the server. The transmission/reception unit 930 provides a function of exchanging the data with an outside device. The storage unit 920 stores the resulting data of the game play. The resulting data of the game play may be stored temporarily or permanently. The outputting unit 910 controls the resulting data of the game play and an output of environment information of the game, and has a function of converting the resulting data of the game play to graphical data and then outputting the converted data.

The central controller 940 controls the above construction elements such that the game can be played in the server transferring environment. The central controller 940 can control such that the transmission/reception unit 930 transmits/receives identification information required for in the login to the first server, and the transmission/reception unit 930 transmits a message including a request for the server transferring to the first server. The first server may be the base server. Further, the central controller 940 accesses the first server or a second server to perform the transferring, receives the resulting data of the game play from the accessed server, and then stores the resulting data of the game play. The second server may be the relay server or the transferring server. The client in FIG. 9 provides the functions of the clients in FIGS. 2, 3, 4, and 5.

FIG. 10 illustrates a construction of information stored in the history database unit according to an embodiment of the present invention.

History information 1000 is an embodiment of information, which can be stored in the history database unit of the server. Player identification information (PID, Player ID) means identification information of a character in the game. Through server identification information (SID, Server ID), it is identified whether a corresponding player is a player of the client accessing the outside server.

Referring to each of the players, both player-1 and player-3 are players of the remote client transferred from the outside server, which is a server-1. Further, a player-5 also is a player of the remote client transferred from the outside server, which is a server-2. Therefore, when the remote client terminates an access, information of the players is transmitted to the original servers, which are server-1 and server-2. The above may be performed in the history update process described above.

A Player-2 and a player-4 have "0" as the SID. This means that the player-2 and the player-4 are players of the local client. The server continuously stores the game history information of the player-2 and the player-4. Even when the player-2 and the player-4 access the server again at a later time after terminating an access, the server allows the player-2 and the player-4 to play the game by using the corresponding information.

Since the player-1, the player-3, and the player-5, which are players of the remote client, are players transferred from the outside server, the server may indicate the players as subjects, which the player-2 and the player-4 should overcome, like the monsters. The server may also indicate the player-2, the player-4, and the play-5 as the monsters to the player-1 and the player-3 transferred from the same server to play the game.

Various conditions may be added to the game played by the server transferring described above, for example, a condition, in which only players having a specific level or energy in the base server can transfer to the outside server, may be added. In this case, the base server may provide the client, through which the player having a level higher than the specific level logs in, with the resulting data of the game play including an indication of a space, which can be transferred to the outside server. Further, the client, through which the player logs in, displays the received resulting data of the game play and enables the player to transfer to the outside server. The above process corresponds to the processes of the server transferring requests in FIGS. 2, 3, 4, and 5. Moreover, the process of the server transferring request may be started by a particular player. For example, when a leader player among a plurality of players makes a request for the server transferring and other players provide an interface corresponding to the server transferring, a plurality of players can transfer to the same outside server.

A competition structure in the server and a competition structure between the servers can be provided through the game played by the server transferring. Further, the game history generated in the competition structure between the servers can be successively used.

Figure 11:
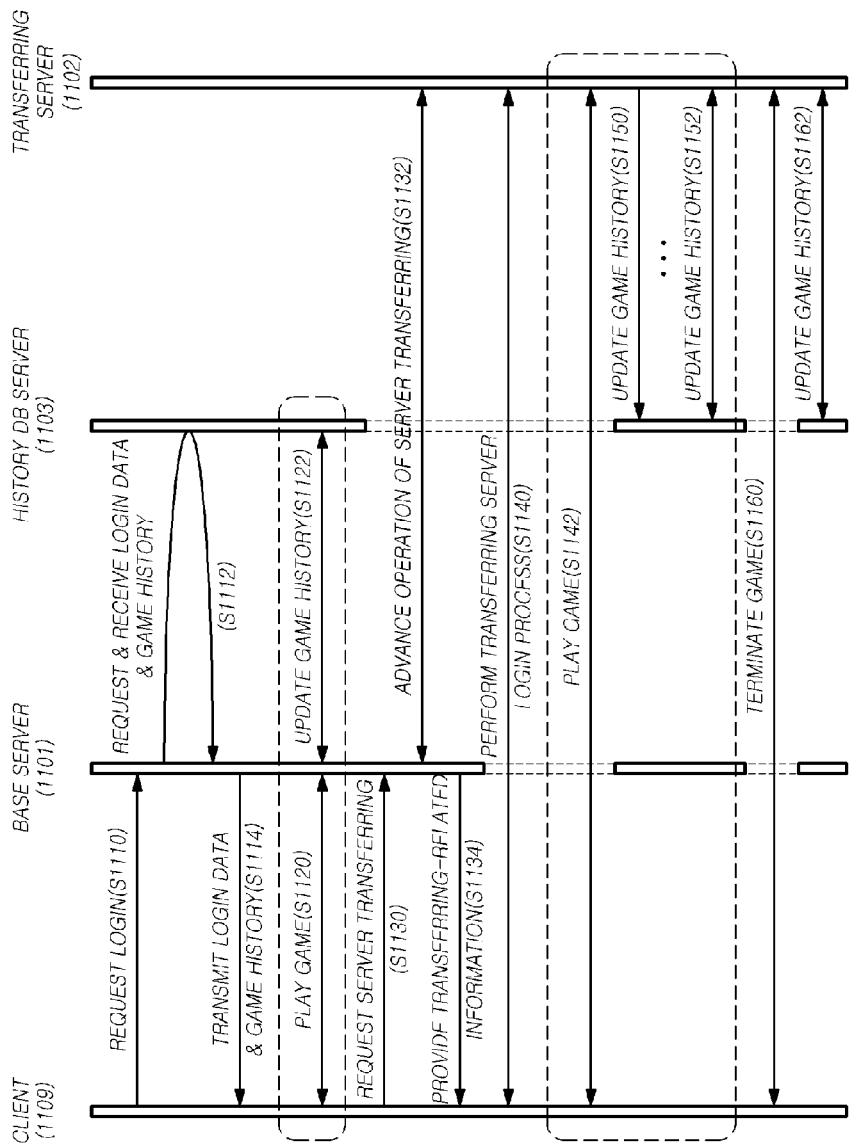
FIG. 11 is a signal flow diagram illustrating a case in which the game history database unit is commonly stored in one server according to another embodiment of the present invention.

FIG. 11 is a signal flow diagram illustrating a case in which the game history database unit is commonly stored in one server according to another embodiment of the present invention.

In FIG. 11, the history Database (DB) server 1103 stores the game histories of players of all clients. Therefore, the base server 1101 and the transferring server 1102 should perform the game history update with the history DB server 1103, regardless of whether the client is the local client or the remote client.

First, the client 1109 makes a request for the login to the base server 1101 S1110. The base server 1101 makes a request for data and a game history, which are required for the login, to the history DB server 1103 in order to perform the login requested from the client 1109, and then receives the data and the history S1112. At this time, the data required for the login includes personal information of a player performing the login through a corresponding client.

Subsequently, the base server 1101 transmits the login data and the game history to the client 1109 S1114, and then plays the game S1120. At this time, since the game history database is stored in the central history DB server 1103, the game history update is performed while the game is played S1122.

Subsequently, the client 1109 makes a request for the server transferring to the base server 1101 while the game is played S1130. The client 1109 can make a request for transferring a particular server, and the base server 1101 can search for the server to be transferred to by the request of the client. The base server 1101 performs an advance operation of the server transferring with the server, which has been searched or requested to be transferred S1132. The advance operation includes providing the transferring server 1102 with information required for playing the game by the client 1109. Since the history data is stored in the history DB server 1103, the base server 1101 is not required to separately provide the transferring server 1102 with the history data. Meanwhile, the base server 1101 can provide the transferring server 1102 with login or identification information of the client 1109. Meanwhile, when information of the level, the ranking, and the possessed items of the client 1109 is also stored in the history DB server 1103, the base server is not required to separately provide the transferring server 1102 with the information. However, the base server can provide the transferring server 1102 with information in a range that the transferring server 1102 can identify the client 1109 to be transferred.

When the advance operation is completed, the base server 1101 provides the client 1109 with the transferring-related information S1134. An embodiment of the provided information may be information including an address of the transferring server 1102, information required for the login, or temporary identification information to be used in the transferring server 1102. When the identification information of users is independently managed for each of the servers, the client 1109 may be allocated the temporary identification information because identification information of a particular user of the base server 1101 cannot be used in the transferring server 1102 without change. When the history DB server 1103 manages information of users of all servers, it is not necessary to separately allocate the information.

Subsequently, the client 1109 plays the game with the transferring server 1102 S1142. The transferring server 1102 updates the game history generated in the process of playing the game to the history DB server 1103 S1150 and S1152. Then, when the game is terminated S1160, the game history update is completed S1162.

Even if it was described above that all of the components of an embodiment of the present invention are coupled as a single unit or coupled to be operated as a single unit, the present invention is not necessarily limited to such an embodiment.

CROSS-REFERENCE TO RELATED APPLICATION

This application claims priority from and the benefit under 35 U.S.C. §119 of a Korean Patent Application No. 10-2010-0047415, filed on May 20, 2010, which is hereby incorporated by reference for all purposes as if fully set forth herein.

The invention claimed is:
1. A method for playing a game with a server transferring in an online game environment, the method comprising:
   receiving, by a base server, identification information for login from a first client;
   transmitting, from the base server, online game environment information to the first client such that the first client plays the game on the base server;
   performing, between the first client and the base server, a first server transferring operation for the first client, and between the base server and an outside server, a second server transferring operation for the first client such that when the first server transferring operation and the second transferring operation are completed, the first client plays the game with a second client on the outside server;
   transmitting, from the first client, data for playing the game to the outside server or the second client;
   receiving, by the base server, a resulting data of the game from the outside server or the second client after the received data are applied to the online game environment; and
   transmitting, via the base server, a result of an interaction generated between the first client and the second client from the outside server or the second client to the first client to update a game history of the first client.

2. A method for playing a game with a server transferring in an online game environment, the method comprising:
   transmitting, from a first client server, identification information for login to a base server;
   transmitting, from the first client server, a message including a request for server transferring to the base server;
   accessing, from the first client server, the base server or a transferring server to be transferred;
   transmitting, from the first client server, data for playing the game to the accessed base server or the accessed transferring server such that when the transmitting data is completed, the game is played on the accessed base server or the accessed transferring server;
   receiving, by the first client server, a resulting data of the game from the accessed base server or the accessed transferring server.

3. A method for playing a game with a server transferring in an online game environment, in an online game server system comprising a first server and a second server providing an online game, the method comprising:
   providing, via a first server, the game by performing a first login for a first client such that the game is played on the first server;
   providing, via a second server, the game by performing a second login with a second client such that the game is played on the second server;
   performing, from the first server and the second server, an operation of the server transferring such that when the operation of the server transferring is completed, the first client and the second client play the game in the second server;
   transmitting, from the second server, a resulting data of the game to the first client and the second client; and
   transmitting, from the second server, a game history of the first client to the first server.

* * * * *